US007161982B2

(12) United States Patent  
Kimoto

(10) Patent No.: US 7,161,982 B2  
(45) Date of Patent: Jan. 9, 2007

(54) DEVICE AND METHOD FOR MOTION VIDEO ENCODING REDUCING IMAGE DEGRADATION IN DATA TRANSMISSION WITHOUT DETERIORATING CODING EFFICIENCY

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 604 days.

(21) Appl. No.: 10/046,817

(22) Filed: Jan. 17, 2002

(65) Prior Publication Data

US 2002/0094028 A1 Jul. 18, 2002

(30) Foreign Application Priority Data

Jan. 17, 2001 (JP) ............................. 2001/008639

(51) Int. Cl.  
*H04N 7/12* (2006.01)
(52) U.S. Cl. ..................... 375/240.13; 375/240.27; 375/240.26
(58) Field of Classification Search ........... 375/240.27, 375/240.26, 240.14, 240.12, 240.13, 240.15, 375/240.16, 240.03; 714/746, 747; 382/252, 382/275; 348/425.1, 425.2; *H04N 7/12*  
See application file for complete search history.

(56) References Cited

U.S. PATENT DOCUMENTS

| | | | | |
|---|---|---|---|---|
| 5,909,559 A | * | 6/1999 | So ................................. 710/307 |
| 6,043,844 A | * | 3/2000 | Bist et al. ................. 375/240.24 |
| 6,408,029 B1 | * | 6/2002 | McVeigh et al. ......... 375/240.13 |
| 6,542,545 B1 | * | 4/2003 | Vetro et al. ............. 375/240.08 |
| 6,574,277 B1 | * | 6/2003 | Miyamoto ............. 375/240.13 |
| 6,574,278 B1 | * | 6/2003 | McVeigh et al. ....... 375/240.18 |

FOREIGN PATENT DOCUMENTS

JP   2000-165881 A   6/2000

OTHER PUBLICATIONS

T. R. Gardos, "Video Codec Test Model, Near-Term, Version 10 (TMN10) Draft 1", published by ITU-T SG16, Apr. 1998, pp. 1-33.

* cited by examiner

*Primary Examiner*—Richard Lee  
(74) *Attorney, Agent, or Firm*—Sughrue Mion, PLLC

(57) ABSTRACT

A code volume control section refers to an input image and a reference image stored in a frame memory and thereby sets a quantization step for each block so that the volume of coded data generated for a frame will be a preset volume. A data loss probability estimation section estimates a data loss probability (the probability that data loss will occur to a target block due to transmission error) based on a code volume predicted value of the target block obtained by the code volume control section and the code volume from the latest synchronization code pattern to a block just before the target block. A degradation estimation calculation section calculates an estimate of degradation of the target block caused by errors based on image degradation power and the data loss probability. A mode selection section selects an optimum encoding mode for the target block based on the degradation estimate of the target block and an estimate of frame coding distortion. Forced refresh (intra-frame encoding of a block) is carried out properly and effectively, thereby image degradation is reduced without deteriorating coding efficiency.

36 Claims, 6 Drawing Sheets

DEVICE AND METHOD FOR MOTION VIDEO ENCODING REDUCING IMAGE DEGRADATION IN DATA TRANSMISSION WITHOUT DETERIORATING CODING EFFICIENCY

BACKGROUND OF THE INVENTION

The present invention relates to a motion video encoding device and a motion video encoding method, and in particular, to a motion video encoding device and a motion video encoding method capable of encoding video signals so as to reduce the degradation of video data caused by errors when coded video signals (compressed video signals, for example) are transmitted via transmission lines of low circuit quality.

DESCRIPTION OF THE RELATED ART

Various encoding methods have been employed for motion video encoding devices. In order to encode and transmit each frame (each input image) of input video data, a conventional motion video encoding device adaptively makes a selection from intra-frame encoding (INTRA) and inter-frame prediction encoding (INTER) for each block (as a unit of encoding) and uses the selected encoding mode for encoding the block. The conventional motion video encoding device makes the encoding mode selection for each block based on coding efficiency. In addition to the encoding mode selection, the conventional motion video encoding device carries out refresh (forced refresh), that is, forcedly encodes a block by means of the intra-frame encoding, in order to reduce the degradation of image quality caused by errors occurring during the transmission of the coded video data.

In the inter-frame prediction encoding, if the image quality degradation (image degradation) occurred to the coded data due to errors in signal transmission, similar degradation occurs to the next frame (which is decoded by reference to the degraded frame). As the probability of the error-caused degradation in a referred area of the transmitted frame increases, the probability of serious degradation in the next frame increases. By such propagation of degradation through frames, subjective image quality is degraded considerably. On the other hand, by forcedly carrying out the refresh to the image of a frame at some midpoint, the propagation of degradation can be avoided and thereby resistance to image degradation can be improved. The degree of degradation when an error occurred to a specific area of an image depends on the distribution of pixel values in the image. Therefore, by carrying out the forced refresh with high priority to blocks from which serious image degradation is expected, the resistance to errors can be improved effectively without deteriorating coding efficiency much.

FIG. 1 is a block diagram showing a conventional motion video encoding device which has been disclosed in Japanese Patent Application Laid-Open No. 2000-165881. The conventional motion video encoding device of FIG. 1 includes a frame memory 10, a degradation power calculation section 12, a block encoding section 18, a mode selection section 24, a code volume control section 25, a counter 26, a data loss probability estimation section 27, a refresh priority calculation section 28, and a refresh block selection section 29.

In the motion video encoding device of FIG. 1, an input image (current frame) 101 and a reference image (reference frame) 102 are stored in the frame memory 10. The reference image 102 is supplied from the block encoding section 18 as a decoded image of a previous frame. The block encoding section 18, which encodes each block of the frame as will be explained later, is also provided with a decoding function. By the decoding function, the block encoding section 18 decodes coded data of a previous frame and sends the decoded image to the frame memory 10 as the reference image 102.

The mode selection section 24 selects the encoding mode for each block of the input image 101 from the intra-frame encoding (INTRA) and the inter-frame prediction encoding (INTER) in consideration of the coding efficiency based on the complexity etc. of the block. The code volume control section 25 sets a quantization step (a step width employed for quantizing image data) for each block so that coding distortion (artifact) will be minimum when the input image 101 is encoded by the encoding mode selected by the mode selection section 24 under the condition that the volume of generated code should be a preset volume or less.

The degradation power calculation section 12 assumes a case where transmission error occurred to coded data of a block, and calculates an error power (degradation power) between a complemented image (an image complemented with lost data) and the original image. The counter 26 monitors the coded data to be transmitted and thereby counts the volume of code from the latest synchronization code pattern (synchronization code) to a block as the target of encoding (hereafter, referred to as "target block"). The data loss probability estimation section 27 receives the count of the counter 26 (code volume from the latest synchronization code pattern to the target block), and estimates the probability of data loss occurring to each block due to transmission error, based on the count.

In this case, the input to the counter 26 is delayed for a frame, therefore, the counter 26 outputs the count with regard to coded data of a frame before. In other words, the counter 26 counts the code volume from the latest synchronization code pattern in the previous frame to the target block in the previous frame (i.e. a block in the previous frame at the same position as the target block) and gives the count to the data loss probability estimation section 27. The data loss probability estimation section 27 estimates the data loss probability for the target block of the current frame, based on the code volume to the target block of the previous frame.

FIGS. 2A through 2C are schematic diagrams for explaining the relationship between the data loss probability and the point when transmission error occurred. As shown in FIG. 2A, synchronization code patterns (synchronization codes) are inserted in the intervals between coded data (each of which including a plurality of blocks). As shown in FIG. 2B and FIG. 2C, a decoder (unshown) receiving the coded data discards data from the error occurrence point to the next synchronization code pattern, and restarts data decoding from the next synchronization code pattern. Therefore, if transmission error occurs at random, the probability of the data discard increases as the coded data gets far from the latest synchronization code pattern. Assuming such decoding operation of the decoder in cases of errors, the data loss probability estimation section 27 estimates the data loss probability higher as the distance from the latest synchronization code pattern gets longer.

The refresh priority calculation section 28 calculates and sets the priority concerning the forced refresh by making threshold judgments with regard to the degradation power of the current frame (which is obtained by the degradation power calculation section 12) and the data loss probability of each block of the current frame (which is obtained by the data loss probability estimation section 27), and sends the refresh priority to the refresh block selection section 29.

The refresh block selection section 29 selects blocks to which the forced refresh (intra-frame encoding) should be executed, based on the refresh priority supplied from the refresh priority calculation section 28. The block encoding section 18 encodes each block of the current frame according to the encoding mode determined by the mode selection section 24 and the refresh block selection section 29 and the quantization step determined by the code volume control section 25, and thereby generates the coded data.

In the conventional motion video encoding device, the forced refresh is carried out with higher priority to blocks having high degradation power and high data loss probability, since the degree of image degradation gets higher if error occurs to such blocks.

However, in the conventional motion video encoding device, the selection of the forcedly refreshed blocks is made independently of the switching of the encoding mode (between the intra-frame encoding and the inter-frame prediction encoding considering the coding efficiency), therefore, depending on the setting of the threshold values used for the mode selection, the intra-frame encoding might be selected for too many blocks, causing deterioration of coding efficiency.

Further, in the conventional motion video encoding device, actual image degradation in cases where transmission error occurred is not reflected sufficiently, and the selection of the forcedly refreshed blocks is not made effectively. Especially, the effects of the propagation of degradation due to the inter-frame prediction encoding are not taken into consideration.

SUMMARY OF THE INVENTION

It is therefore the primary object of the present invention to provide a motion video encoding device and a motion video encoding method, by which the forced refresh can be carried out properly and effectively, and thereby image degradation can be reduced without deteriorating the coding efficiency.

In accordance with a first aspect of the present invention, there is provided a motion video encoding device which adaptively selects and uses intra-frame encoding or inter-frame prediction encoding for encoding each block as an encoding unit, comprising frame memory means, block encoding means, code counting means, code volume control means, data loss probability estimation means, frame coding distortion estimation means, degradation power calculation means, degradation estimation calculation means and mode selection means. The frame memory means stores an input image and a reference image as the result of decoding of a frame before. The block encoding means refers to the input image stored in the frame memory means and carries out a block encoding process for each block of the input image according to a selected encoding mode and a quantization step designating the width of quantization of image data, and thereby generates coded data. The code counting means monitors the coded data and thereby counts the code volume from the latest synchronization code pattern inserted in the coded data to coded data of a block that has been encoded latest. The code volume control means refers to the code volume of the coded data outputted by the block encoding means and a pixel value distribution statistic obtained by analyzing the input image and the reference image stored in the frame memory means, thereby calculates the quantization step for each block and for each selectable encoding mode so that image distortion caused by the block encoding process will be minimum, and outputs a code volume predicted value assigned to a target block which will be encoded next, under the condition that the code volume for a frame should be a preset volume or less. The data loss probability estimation means estimates the probability that data loss will occur to the target block due to transmission error, based on the code volume predicted value assigned to the target block, the code volume counted by the code counting means, and a preset error probability per bit. The frame coding distortion estimation means estimates frame coding distortion as image distortion caused by the block encoding processes for the frame, by referring to the pixel value distribution statistic of the input image obtained by the code volume control means. The degradation power calculation means calculates degradation power as error power between the input image and a decoded image assuming that data loss occurred to the target block during data transmission of the coded data, by use of the input image or the reference image stored in the frame memory means. The degradation estimation calculation means calculates a degradation estimation as an expected value of image degradation occurring to the target block due to data loss caused by transmission error, for each block and for each selectable encoding mode, based on the degradation power calculated by the degradation power calculation means and the data loss probability estimated by the data loss probability estimation means. The mode selection means selects an optimum encoding mode for the target block by referring to the degradation estimation calculated by the degradation estimation calculation means and the frame coding distortion estimated by the frame coding distortion estimation means.

In accordance with a second aspect of the present invention, in the first aspect, the degradation power calculation means complements pixel values of the target block with pixel values of surrounding pixels of the input image, and regards error power between the complemented image and the input image as the degradation power.

In accordance with a third aspect of the present invention, in the first aspect, the degradation power calculation means complements pixel values of the target block with pixel values of a block of the reference image at the same position as the target block, and regards error power between the complemented image and the input image as the degradation power.

In accordance with a fourth aspect of the present invention, in the first aspect, the degradation power calculation means complements pixel values of the target block by copying pixel values from a motion compensation area of the reference image corresponding to the target block, and regards error power between the complemented image and the input image as the degradation power.

In accordance with a fifth aspect of the present invention, in the first aspect, the data loss probability estimation means estimates the probability that data loss will occur to the target block due to transmission error, by adding the code volume predicted value assigned to the target block by the code volume control means to the code volume counted by the code counting means and multiplying the sum by the preset error probability per bit.

In accordance with a sixth aspect of the present invention, in the first aspect, the degradation estimation calculation means obtains the degradation estimation in the case of the intra-frame encoding by multiplying the degradation power calculated by the degradation power calculation means by the data loss probability estimated by the data loss probability estimation means. The degradation estimation calculation means obtains the degradation estimation in the case of the inter-frame prediction encoding by obtaining the product of the degradation power and the data loss probability, obtaining a degradation propagation term as a degradation estimation of a referred area of the reference image which is referred to for a motion compensation process in the inter-frame prediction encoding, and adding the degradation propagation term to the product.

In accordance with a seventh aspect of the present invention, in the first aspect, the degradation estimation calculation means obtains the degradation estimation in the case of the intra-frame encoding by multiplying the degradation power calculated by the degradation power calculation means by the data loss probability estimated by the data loss probability estimation means. The degradation estimation calculation means obtains the degradation estimation in the case of the inter-frame prediction encoding by obtaining the product of the degradation power and the data loss probability, obtaining a degradation propagation term as a weighted average of degradation estimations of blocks overlapping with a referred area of the reference image which is referred to for a motion compensation process in the inter-frame prediction encoding, and adding the degradation propagation term to the product.

In accordance with an eighth aspect of the present invention, in the first aspect, the degradation estimation calculation means obtains the degradation estimation in the case of the intra-frame encoding by multiplying the degradation power calculated by the degradation power calculation means by the data loss probability estimated by the data loss probability estimation means. The degradation estimation calculation means obtains the degradation estimation in the case of the inter-frame prediction encoding by obtaining the product of the degradation power and the data loss probability, obtaining a degradation propagation term as a degradation estimation of a referred area of the reference image which is referred to for a motion compensation process in the inter-frame prediction encoding, multiplying the degradation propagation term by a proportionality constant, and adding the multiplied degradation propagation term to the product.

In accordance with a ninth aspect of the present invention, in the first aspect, the mode selection means obtains the degradation estimation of the target block in each candidate encoding mode from the degradation estimation calculation means, obtains the frame coding distortion in each candidate encoding mode from the frame coding distortion estimation means, and selects a candidate encoding mode that minimizes the sum of the degradation estimation and the frame coding distortion as the optimum encoding mode for the target block.

In accordance with a tenth aspect of the present invention, in the first aspect, the motion video encoding device further comprises block coding distortion estimation means for estimating block coding distortion as image distortion caused by the block encoding process for the target block by referring to the input image and the reference image stored in the frame memory means and the quantization step calculated by the code volume control means. The mode selection means selects an optimum encoding mode for the target block from the intra-frame encoding, the inter-frame prediction encoding and another encoding mode "skip" in which pixel values are directly copied from a block of the reference image at the same position as the target block, by referring to the degradation estimation calculated by the degradation estimation calculation means, the frame coding distortion estimated by the frame coding distortion estimation means and the block coding distortion estimated by the block coding distortion estimation means. The degradation estimation calculation means calculates the degradation estimation as an expected value of image degradation occurring to the target block due to data loss caused by transmission error, for each block and for each of the selectable encoding modes: the intra-frame encoding; the inter-frame prediction encoding; and the skip, based on the degradation power calculated by the degradation power calculation means and the data loss probability estimated by the data loss probability estimation means.

In accordance with an eleventh aspect of the present invention, in the tenth aspect, the block coding distortion estimation means estimates the block coding distortion of the target block in the case of the intra-frame encoding or the inter-frame prediction encoding, as quantization distortion by use of the quantization step calculated by the code volume control means. The block coding distortion estimation means estimates the block coding distortion of the target block in the case of the skip, by obtaining error power between the target block and a block of the reference image at the same position as the target block and regarding the error power as the block coding distortion. The data loss probability estimation means estimates the data loss probability of the target block in the case of the intra-frame encoding or the inter-frame prediction encoding, based on the code volume predicted value assigned to the target block, the code volume counted by the code counting means, and a preset error probability per bit. The data loss probability estimation means estimates the data loss probability of the target block in the case of the skip, based on the code volume of a skip code which indicates that the encoding mode is the skip, the code volume counted by the code counting means, and a preset error probability per bit. The degradation estimation calculation means calculates the degradation estimation of the target block in the case of the skip, in the same way as the case of the inter-frame prediction encoding.

In accordance with a twelfth aspect of the present invention, in the tenth aspect, the mode selection means obtains the degradation estimation of the target block in each of the intra-frame encoding and the inter-frame prediction encoding from the degradation estimation calculation means, obtains the frame coding distortion in each of the intra-frame encoding and the inter-frame prediction encoding from the frame coding distortion estimation means, selects an encoding mode that minimizes the sum of the degradation estimation and the frame coding distortion from the intra-frame encoding and the inter-frame prediction encoding as a candidate optimum encoding mode for the target block, compares the selected candidate optimum encoding mode with the skip by making a comparison between the two encoding modes with regard to the sum of the degradation estimation calculated by the degradation estimation calculation means and the block coding distortion estimated by the block coding distortion estimation means, and selects one of the two encoding modes that minimizes the sum as the optimum encoding mode for the target block.

In accordance with a thirteenth aspect of the present invention, there is provided a motion video encoding method which adaptively selects and uses intra-frame encoding or inter-frame prediction encoding for encoding each block as an encoding unit, comprising an image storage step, a block encoding step, a code counting step, a code volume control step, a data loss probability estimation step, a frame coding distortion estimation step, a degradation power calculation step, a degradation estimation calculation step and a mode selection step. In the image storage step, an input image and a reference image as the result of decoding of a frame before are stored in a frame memory. In the block encoding step, the input image stored in the frame memory is referred to and a block encoding process is carried out for each block of the input image according to a selected encoding mode and a quantization step designating the width of quantization of image data, and thereby coded data is generated. In the code counting step, the coded data is monitored and thereby the code volume from the latest synchronization code pattern inserted in the coded data to coded data of a block that has been encoded latest is counted. In the code volume control step, the code volume of the coded data generated in the block encoding step and a pixel value distribution statistic obtained by analyzing the input image and the reference image stored in the frame memory are referred to, thereby the quantization step is calculated for each block and for each selectable encoding mode so that image distortion caused by the block encoding process will be minimum, and a code volume predicted value assigned to a target block which will be encoded next is outputted, under the condition that the code volume for a frame should be a preset volume or less. In the data loss probability estimation step, the probability that data loss will occur to the target block due to transmission error is estimated based on the code volume predicted value assigned to the target block, the code volume counted in the code counting step, and a preset error probability per bit. In the frame coding distortion estimation step, frame coding distortion is estimated as image distortion caused by the block encoding processes for the frame, by referring to the pixel value distribution statistic of the input image obtained in the code volume control step. In the degradation power calculation step, degradation power is calculated as error power between the input image and a decoded image assuming that data loss occurred to the target block during data transmission of the coded data, by use of the input image or the reference image stored in the frame memory. In the degradation estimation calculation step, a degradation estimation is calculated as an expected value of image degradation occurring to the target block due to data loss caused by transmission error, for each block and for each selectable encoding mode, based on the degradation power calculated in the degradation power calculation step and the data loss probability estimated in the data loss probability estimation step. In the mode selection step, an optimum encoding mode for the target block is selected by referring to the degradation estimation calculated in the degradation estimation calculation step and the frame coding distortion estimated in the frame coding distortion estimation step.

In accordance with a fourteenth aspect of the present invention, in the thirteenth aspect and in the degradation power calculation step, pixel values of the target block are complemented with pixel values of surrounding pixels of the input image, and error power between the complemented image and the input image is regarded as the degradation power.

In accordance with a fifteenth aspect of the present invention, in the thirteenth aspect and in the degradation power calculation step, pixel values of the target block are complemented with pixel values of a block of the reference image at the same position as the target block, and error power between the complemented image and the input image is regarded as the degradation power.

In accordance with a sixteenth aspect of the present invention, in the thirteenth aspect and in the degradation power calculation step, pixel values of the target block are complemented by copying pixel values from a motion compensation area of the reference image corresponding to the target block, and error power between the complemented image and the input image is regarded as the degradation power.

In accordance with a seventeenth aspect of the present invention, in the thirteenth aspect and in the data loss probability estimation step, the probability that data loss will occur to the target block due to transmission error is estimated by adding the code volume predicted value assigned to the target block in the code volume control step to the code volume counted in the code counting step and multiplying the sum by the preset error probability per bit.

In accordance with an eighteenth aspect of the present invention, in the thirteenth aspect and in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a degradation estimation of a referred area of the reference image which is referred to for a motion compensation process in the inter-frame prediction encoding, and adding the degradation propagation term to the product.

In accordance with a nineteenth aspect of the present invention, in the thirteenth aspect and in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a weighted average of degradation estimations of blocks overlapping with a referred area of the reference image which is referred to for a motion compensation process in the inter-frame prediction encoding, and adding the degradation propagation term to the product.

In accordance with a twentieth aspect of the present invention, in the thirteenth aspect and in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a degradation estimation of a referred area of the reference image which is referred to for a motion compensation process in the inter-frame prediction encoding, multiplying the degradation propagation term by a proportionality constant, and adding the multiplied degradation propagation term to the product.

In accordance with a twenty-first aspect of the present invention, in the thirteenth aspect and in the mode selection step, the degradation estimation of the target block in each candidate encoding mode is obtained from the degradation estimation calculation step, the frame coding distortion in each candidate encoding mode is obtained from the frame coding distortion estimation step, and a candidate encoding mode that minimizes the sum of the degradation estimation and the frame coding distortion is selected as the optimum encoding mode for the target block.

In accordance with a twenty-second aspect of the present invention, in the thirteenth aspect, the motion video encoding method further comprises a block coding distortion estimation step for estimating block coding distortion as image distortion caused by the block encoding process for the target block by referring to the input image and the reference image stored in the frame memory and the quantization step calculated in the code volume control step. In the mode selection step, an optimum encoding mode for the target block is selected from the intra-frame encoding, the inter-frame prediction encoding and another encoding mode "skip" in which pixel values are directly copied from a block of the reference image at the same position as the target block, by referring to the degradation estimation calculated in the degradation estimation calculation step, the frame coding distortion estimated in the frame coding distortion estimation step and the block coding distortion estimated in the block coding distortion estimation step. In the degradation estimation calculation step, the degradation estimation is calculated as an expected value of image degradation occurring to the target block due to data loss caused by transmission error, for each block and for each of the selectable encoding modes: the intra-frame encoding; the inter-frame prediction encoding; and the skip, based on the degradation power calculated in the degradation power calculation step and the data loss probability estimated in the data loss probability estimation step.

In accordance with a twenty-third aspect of the present invention, in the twenty-second aspect and in the block coding distortion estimation step, the block coding distortion of the target block in the case of the intra-frame encoding or the inter-frame prediction encoding is estimated as quantization distortion by use of the quantization step calculated in the code volume control step, and the block coding distortion of the target block in the case of the skip is estimated by obtaining error power between the target block and a block of the reference image at the same position as the target block and regarding the error power as the block coding distortion. In the data loss probability estimation step, the data loss probability of the target block in the case of the intra-frame encoding or the inter-frame prediction encoding is estimated based on the code volume predicted value assigned to the target block, the code volume counted in the code counting step, and a preset error probability per bit, and the data loss probability of the target block in the case of the skip is estimated based on the code volume of a skip code which indicates that the encoding mode is the skip, the code volume counted in the code counting step, and a preset error probability per bit. In the degradation estimation calculation step, the degradation estimation of the target block in the case of the skip is calculated in the same way as the case of the inter-frame prediction encoding.

In accordance with a twenty-fourth aspect of the present invention, in the twenty-second aspect and in the mode selection step, the degradation estimation of the target block in each of the intra-frame encoding and the inter-frame prediction encoding is obtained from the degradation estimation calculation step, the frame coding distortion in each of the intra-frame encoding and the inter-frame prediction encoding is obtained from the frame coding distortion estimation step, an encoding mode that minimizes the sum of the degradation estimation and the frame coding distortion is selected from the intra-frame encoding and the inter-frame prediction encoding as a candidate optimum encoding mode for the target block, the selected candidate optimum encoding mode is compared with the skip by making a comparison between the two encoding modes with regard to the sum of the degradation estimation calculated in the degradation estimation calculation step and the block coding distortion estimated in the block coding distortion estimation step, and one of the two encoding modes that minimizes the sum is selected as the optimum encoding mode for the target block.

In accordance with twenty-fifth through thirty-sixth aspects of the present invention, there are provided machine-readable record mediums storing programs for instructing a microprocessor unit etc. to execute the motion video encoding methods of the thirteenth through twenty-fourth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
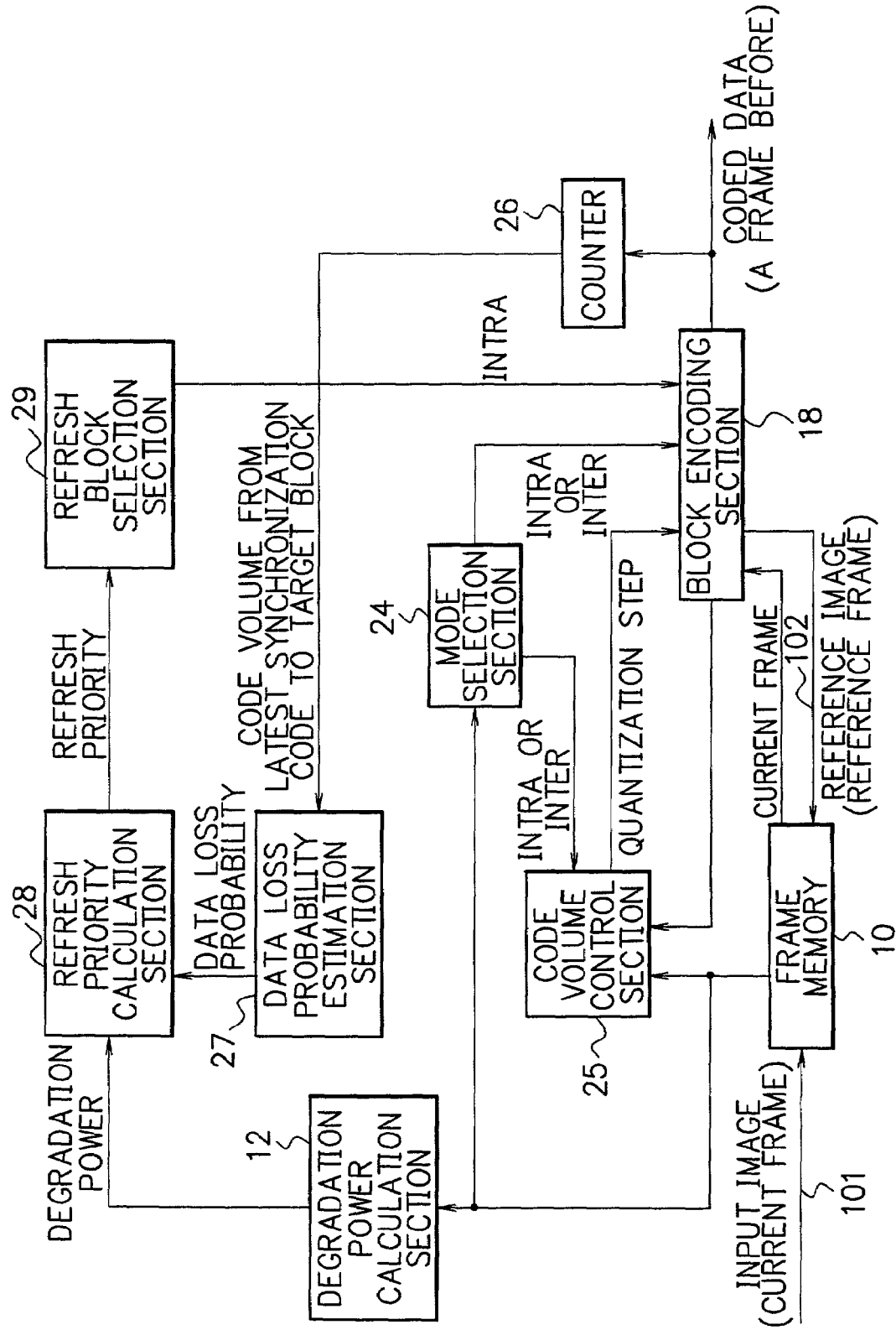
FIG. 1 is a block diagram showing a conventional motion video encoding device.
Figure 2:
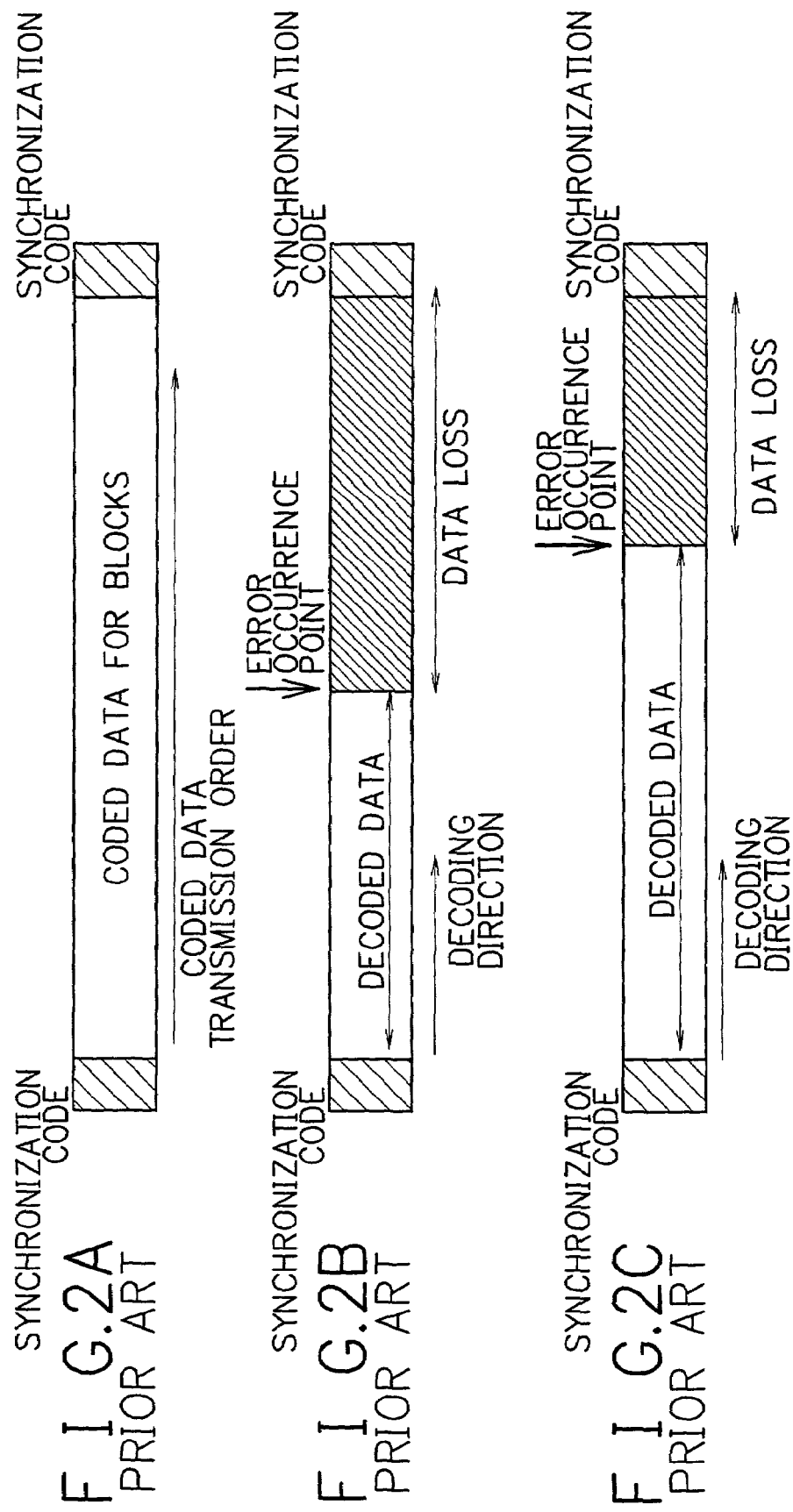
FIGS. 2A through 2C are schematic diagrams for explaining the relationship between the data loss probability and the point when transmission error occurred.

Referring now to the drawings, a description will be given in detail of preferred embodiments in accordance with the present invention.

[Embodiment 1]

Figure 3:
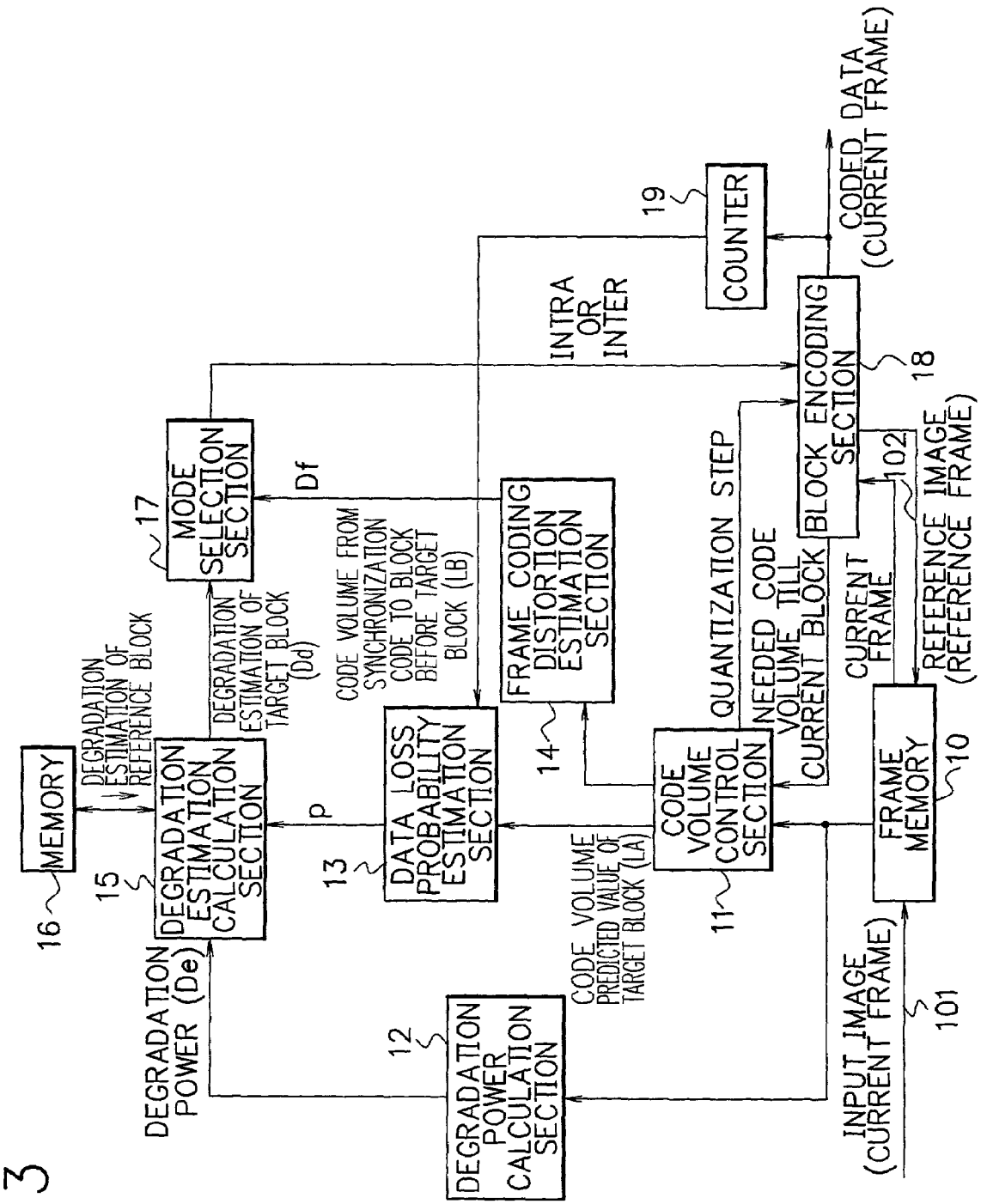
FIG. 3 is a block diagram showing an example of the composition of a motion video encoding device in accordance with a first embodiment of the present invention.

FIG. 3 is a block diagram showing an example of the composition of a motion video encoding device in accordance with a first embodiment of the present invention. The motion video encoding device of FIG. 3 includes a frame memory 10, a code volume control section 11, a degradation power calculation section 12, a data loss probability estimation section 13, a frame coding distortion estimation section 14, a degradation estimation calculation section 15, a memory 16, a mode selection section 17, a block encoding section 18, and a counter 19.

The components shown in FIG. 3 can be implemented by, for example, a microprocessor unit which is composed of a CPU (Central Processing Unit), ROM (Read Only Memory), RAM (Random Access Memory), etc., and appropriate software. Such software for realizing the operation of the motion video encoding device is stored in one or more record mediums and provided to the motion video encoding device so as to be loaded into the device.

The code volume control section 11 refers to a statistic concerning pixel value distribution (obtained by analyzing an input image and a reference image which are stored in the frame memory 10) and an actual volume of code which has been necessary until the current block of the current frame (that is, code volume to a block just before the target block), and thereby sets a quantization step so that distortion caused by the encoding process will be minimum under the condition that the code volume for a frame should be a preset volume or less. The code volume control section 11 carries out the setting of the quantization step for each encoding mode that is selectable for the target block: the intra-frame encoding and the inter-frame prediction encoding.

[Example of the Code Volume Control Method]

The following explanation will be giving taking a method disclosed in Chapter 8 of "Video Codec Test Model, Near-Term, Version 10 (TMN10) Draft1" (published by ITU-T SG16), as an example of the code volume control method. Incidentally, even if other code volume control methods are employed, the quantization step setting and frame coding distortion estimation which will be explained later can be carried out and applied to the present invention.

By describing the quantization step as "Q", pixel value variance in a block as "$\sigma^2$", and the number of pixels in the block as "A", the volume (r) of code which is generated by encoding the block can be approximated as:

$$r = A \cdot (K \cdot \sigma^2 / Q^2 + C) \quad (1),$$

where K and C are proportionality constants.

In the above equation (1), the pixel value variance $\sigma^2$ is given as the variance of a prediction error signal when the block has been encoded by means of the inter-frame prediction encoding, whereas the pixel value variance $\sigma^2$ is given as ⅓ of the variance of the original video signal when the block has been encoded by means of the intra-frame encoding.

If we describe the sum total of $\sigma$ for blocks (as targets of encoding) in a frame as "S", a code volume that should be assigned to the frame (target code volume) as "R", and the number of the blocks as targets of encoding as "N", a quantization step ($Q_{opt}$) capable of minimizing the sum total of quantization distortion can be expressed as:

$$Q_{opt} = (A \cdot K \cdot \sigma \cdot S/L)^{1/2} \quad (2),$$

where $L = R - A \cdot N \cdot C$.

The code volume control section 11 changes the quantization step so that the quantization step for each block will approach the optimum quantization step $Q_{opt}$. For example, in "H.263" and "MPEG-4" as international standards for motion video encoding, the change of the quantization step from that of the previous block is limited to −4, −2, 0, +2 or +4. The block encoding section 18 encodes the current block by use of the quantization step which has been set as above, while counting the code volume actually needed until the point in time, and returns the counted code volume to the code volume control section 11.

The code volume control section 11 distributes code volumes (executes bit allocation) to remaining blocks so that the sum of code volumes: a first code volume (that has actually been necessary till the current block of the current frame) and a second code volume (that will be necessary for the remaining blocks to be encoded), will reach the target code volume R. In this model, the sum total of the coding distortion for the blocks as targets of encoding (frame coding distortion Df) is estimated as:

$$Df = A^2 \cdot K \cdot S^2 / 12L \quad (3).$$

The frame coding distortion estimation section 14 calculates the frame coding distortion Df by use of S (the sum total of $\sigma$ for the blocks as targets of encoding) which has been calculated by the code volume control section 11, and outputs the frame coding distortion Df to the mode selection section 17. Meanwhile, the code volume control section 11 calculates a predicted value of the code volume for the next block (target block) according to the above equation (1) and sends the code volume predicted value to the data loss probability estimation section 13.

The degradation power calculation section 12 assumes a case where transmission error occurred to coded data of a block, and calculates an error power (degradation power) "De" between a complemented image (an image complemented with lost data) and the original image.

Figure 4A:
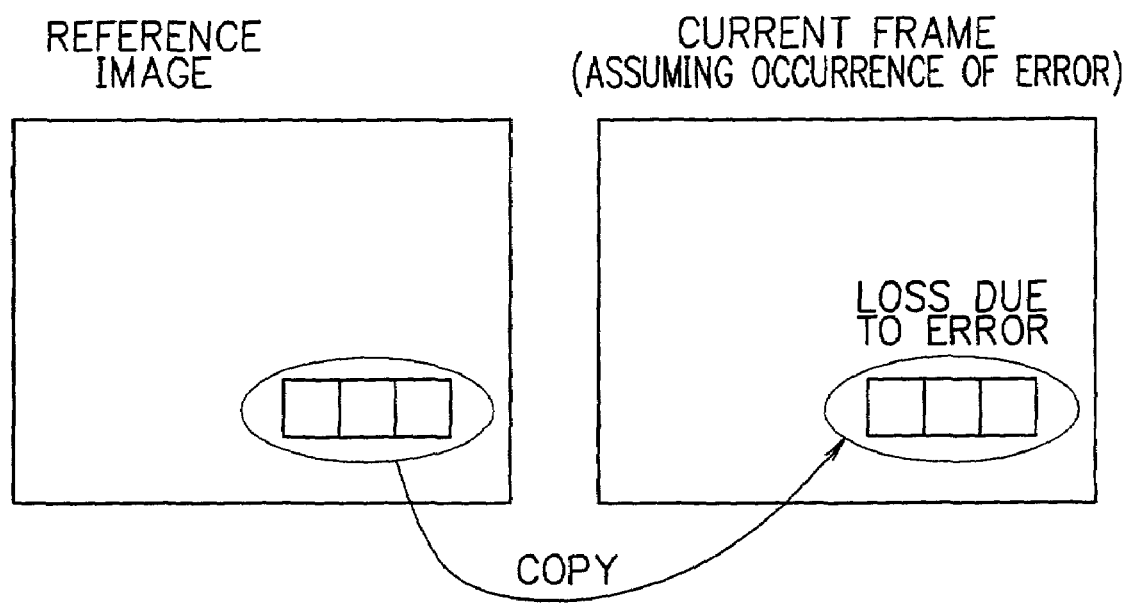
FIGS. 4A and 4B are schematic diagrams showing examples of processes for complementing the current frame with lost data.

FIG. 4A is a schematic diagram showing an example of a process for complementing the current frame with lost data. In the example of FIG. 4A, transmission error is assumed to have occurred to coded data of blocks of the current frame. Lost data (pixel values) of the blocks of the current frame are complemented by directly copying pixel values from corresponding blocks of the reference image (reference frame) at the same positions as the blocks of the current frame. The degree of image degradation in this case is expressed by the pixel value differences between the corresponding blocks of the reference image and the current frame.

Figure 4B:
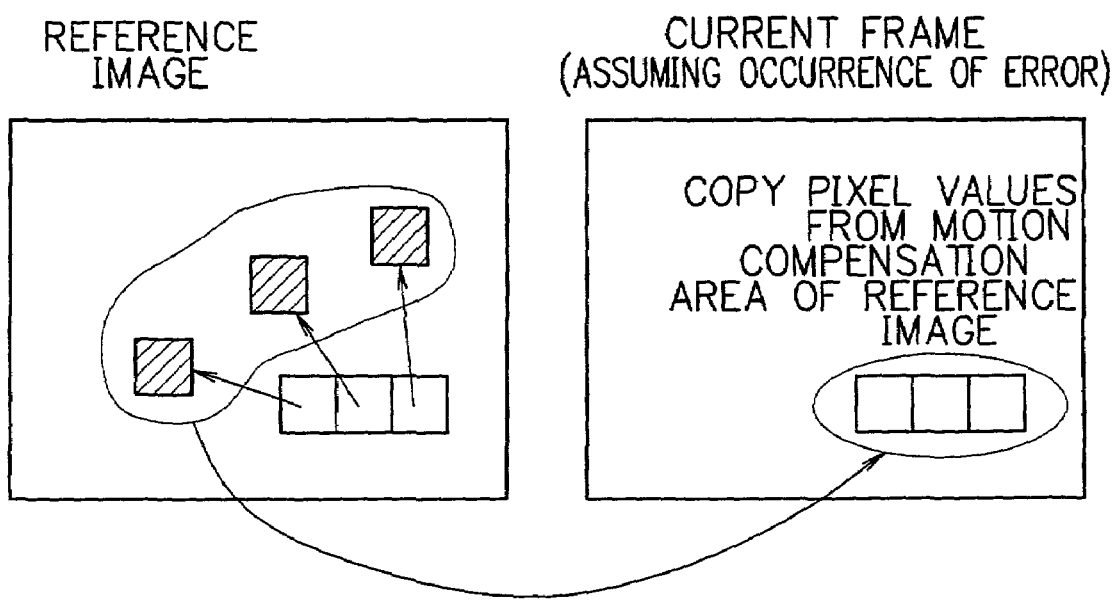

FIG. 4B shows another example of a process for complementing the current frame with lost data. In the example of FIG. 4B, lost data (pixel values) of the blocks of the current frame is complemented by copying pixel values from motion compensation areas of the reference image corresponding to the blocks. It is also possible to complement the lost data (pixel values) of the blocks of the current frame with pixel values of surrounding pixels of the input image (current frame).

The degradation power calculation section 12 assumes such a complementing process by the decoder, generates a complemented image in the same way as the decoder by use of the reference image stored in the frame memory 10, and calculates an error power (degradation power De) between the complemented image and the original image (current frame).

The data loss probability estimation section 13 estimates the probability of the occurrence of data loss in the target block due to errors (data loss probability "p") based on the code volume predicted value (LA) of the target block which is obtained by the code volume control section 11 and a code volume (LB) from the latest synchronization code pattern to a block just before the target block (to a code sequence corresponding to a block that has been coded latest) which is counted by the counter 19. Describing LA+LB as "L0" and an error probability per bit (preset) as "$\lambda$" and assuming random occurrence of errors, an equation for calculating the data loss probability p is given as:

$$p = 1 - (1 - \lambda)^{L0} \quad (4).$$

When $\lambda$ is very small, the above equation (4) can be approximated as $p = \lambda \cdot L0$.

The degradation estimation calculation section 15 refers to the degradation power De of the current frame which has been calculated by the degradation power calculation section 12, the data loss probability p of the target block of the current frame which has been calculated by the data loss probability estimation section 13, and a degradation estimations concerning reference blocks in the previous frame which have been stored in the memory 16, and thereby estimates the degree of degradation in case where error occurred to the target block (degradation estimation "Dd" of the target block) with regard to each encoding mode selectable for the target block (intra-frame encoding, inter-frame prediction encoding).

The degradation estimation Dd of the target block varies depending on whether the encoding mode for the target block is the intra-frame encoding or the inter-frame prediction encoding. In the case of the intra-frame encoding, the degradation estimation Dd of the target block is expressed as the expected value of image degradation when data of the target block is lost due to errors, that is, as the product of the data loss probability p and the degradation power De (Dd=p·De). On the other hand, in the case of the inter-frame prediction encoding, the degradation estimation Dd of the target block is obtained by adding a propagation term "Dp" (indicating the propagation of image degradation of the reference frame due to the inter-frame prediction) to the product p·De (Dd=p·De+Dp). The propagation of image degradation will be explained referring to FIG. 5.

Figure 5:
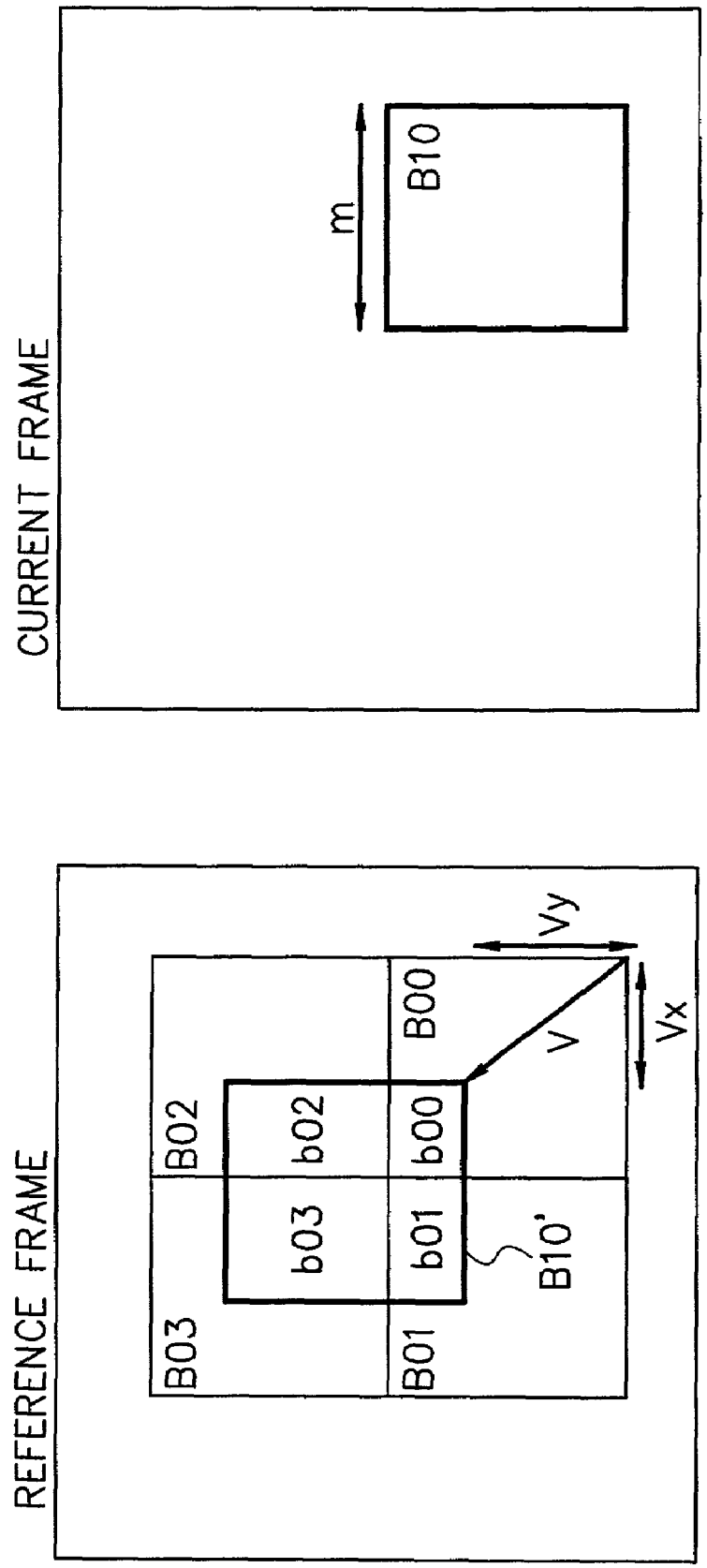
FIG. 5 is a schematic diagram for explaining the propagation of image degradation of the previous frame to the current frame.

Referring to FIG. 5, the reference character "B10" denotes the target block of the current frame, and the reference character "B10'" denotes an area (motion compensation area) of the reference frame that is referred to for motion compensation inter-frame prediction (hereafter, called "referred area"). Blocks B00, B01, B02 and B03 of the reference frame overlapping with the referred area B10' will be called "reference blocks (B00, B01, B02 and B03)", and parts of the reference blocks B00, B01, B02 and B03 included in the referred area B10' will be described as areas "b00", "b01", "b02" and "b03", respectively. A motion vector for the target block B10 will be described as a vector "V".

By the inter-frame prediction encoding, the target block B10 inherits the entire image degradation of the referred area B10'. The image degradation of the referred area B10' is equal to image degradation of the areas b00, b01, b02 and b03 added together. The image degradation of each area (b00, b01, b02, b03) is approximated by multiplying the image degradation of a corresponding reference block (B00, B01, B02, B03) by an area ratio.

The area ratio can be obtained by use of the motion vector V. If we describe the length (width) of each block as "m", the length of the projection of the motion vector V on the horizontal axis (x-axis) as "Vx", and the length of the projection of the motion vector V on the vertical axis (y-axis) as "Vy", the area ratio of the area b00 to the reference block B00 can be expressed as (m−Vx)·(m−Vy)/(m·m). Area ratios for the other areas b01, b02 and b03 can be obtained similarly.

Therefore, the degradation propagation term Dp of the target block B10 inherited from the reference frame can be obtained by referring to degradation estimations of the reference blocks B00, B01, B02 and B03 which have been stored in the memory 16, multiplying each degradation estimation by a weight according to the motion vector V, and adding the weighted degradation estimations together.

The mode selection section 17 compares the sum (Dd (degradation estimation)+Df (frame coding distortion)) when the encoding mode for the target block is the intra-frame encoding with the sum (Dd+Df) when the encoding mode for the target block is the inter-frame prediction encoding, and selects one of the encoding modes that minimizes the sum (Dd+Df). The block encoding section 18 encodes the target block according to the encoding mode selected by the mode selection section 17 and the quantization step calculated by the code volume control section 11, thereby coded data for the target block is generated.

Incidentally, while the degradation estimation Dd in the inter-frame prediction encoding was obtained in the above explanation by simply adding the degradation propagation term (Dp) inherited from the previous frame to the degradation expected value (p·De) in the current frame, it is also possible to assign weights to the degradation propagation term (Dp) from the previous frame and/or the degradation expected value (p·De) in the current frame and change the weights depending on image quality adjustment in the designing stage.

For example, by weighting the degradation propagation term (Dp) from the previous frame with a factor larger than 1, the intra-frame encoding is preferentially carried out to blocks having large degradation propagation from the previous frame, thereby stagnation of degraded blocks across frames can be avoided. In addition, it is also possible to let the mode selection section 17 execute the mode selection so as to minimize the degradation estimation Dd of the target block only, without the consideration to the frame coding distortion Df. In this case, coding efficiency deteriorates, however, encoding having optimum resistance to errors can be realized.

[Embodiment 2]

Figure 6:
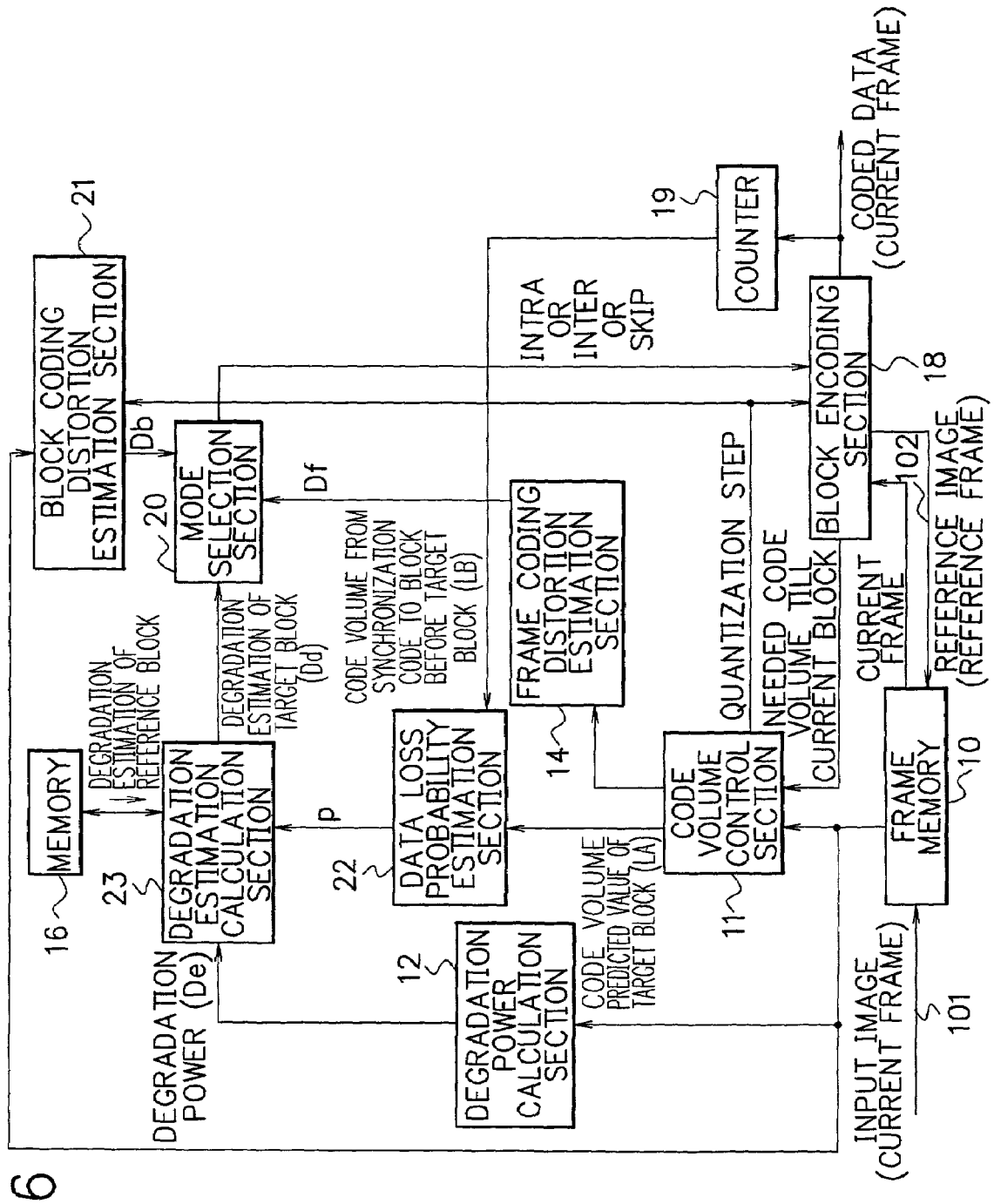
FIG. 6 is a block diagram showing an example of the composition of a motion video encoding device in accordance with a second embodiment of the present invention.

FIG. 6 is a block diagram showing an example of the composition of a motion video encoding device in accordance with a second embodiment of the present invention. The motion video encoding device of FIG. 6 further includes a block coding distortion estimation section 21, in comparison with the first embodiment of FIG. 3.

The mode selection section 20 shown in FIG. 6 operates a little differently from the mode selection section 17 of FIG. 3. The mode selection section 20 refers to block coding distortion Db which is calculated by the block coding distortion estimation section 21 in addition to the degradation estimation Dd of the target block calculated by the degradation estimation calculation section 23 and the frame coding distortion Df calculated by the frame coding distortion estimation section 14, and thereby selects an encoding mode from three encoding modes: the intra-frame encoding (INTRA); the inter-frame prediction encoding (INTER); and "skip" (SKIP).

When the encoding mode selected by the mode selection section 20 is SKIP, the block encoding section 18 does not encode motion information nor coefficient information with regard to the target block but outputs a skip code (code pattern indicating that the encoding mode is SKIP) only. In this case, the decoding of the target block of the current frame is carried out by the decoder by copying decoded data of a corresponding block of the previous frame.

The block coding distortion estimation section 21 estimates the coding distortion Db of the target block (block coding distortion) for each encoding mode (intra-frame encoding, inter-frame prediction encoding, skip).

When the encoding mode is the intra-frame encoding or the inter-frame prediction encoding, the coding distortion Db is equal to the error power caused by quantization. In this case, the block coding distortion estimation section 21 estimates the coding distortion Db of the target block by referring to the quantization step in each encoding mode (intra-frame encoding, inter-frame prediction encoding). For example, when the quantization is carried out by linear quantization, the coding distortion Db of the target block is estimated as $Db=Q^2/12 \cdot A$ (Q: quantization step, A: the number of pixels in the block).

On the other hand, when the encoding mode is SKIP, decoded image of the target block of the current frame will be the same as decoded image of a corresponding block (target block) in the previous frame, therefore, the coding distortion Db is expressed as error power between the previous frame and the current frame. In this case, the block coding distortion estimation section 21 obtains the error power between the previous frame and the current frame and regards the error power as the coding distortion Db of the target block.

For the encoding mode SKIP, the data loss probability estimation section 22 and the degradation estimation calculation section 23 shown in FIG. 6 also operate differently from the data loss probability estimation section 13 and the degradation estimation calculation section 15 of the first embodiment. When the encoding mode is SKIP, the data loss probability estimation section 22 estimates the data loss probability p of the target block, based on the code volume necessary for the skip code (indicating that the encoding mode is SKIP) and the code volume counted by the counter 19 (code volume from the latest synchronization code pattern to a block just before the target block). The degradation estimation calculation section 23 calculates the degradation estimation Dd for the encoding mode SKIP based on the data loss probability p obtained by the data loss probability estimation section 22, in the same way as the case where the encoding mode is the inter-frame prediction encoding.

The mode selection section 20 first selects a candidate encoding mode from the intra-frame encoding and the inter-frame prediction encoding in the same way as the mode selection section 17 of the first embodiment, thereafter compares the selected candidate encoding mode with the encoding mode SKIP by making a comparison between the two modes with regard to (Dd+Db) (that is, the degradation estimation Dd calculated by the degradation estimation calculation section 23 and the block coding distortion Db estimated by the block coding distortion estimation section 21 added together), and selects one of the two encoding modes that minimizes the sum Dd+Db as the optimum encoding mode for the target block.

As set forth hereinabove, in the motion video encoding device and the motion video encoding method in accordance with the present invention, the encoding mode selection is carried out so that the sum of the error-caused degradation and the coding distortion will be minimum. By such encoding mode selection for each block, the forced refresh can be carried out properly and effectively and thereby image degradation can be reduced without deteriorating the coding efficiency.

Further, in the present invention, the degree of image degradation caused by transmission error is estimated for each block, and the intra-frame encoding is carried out with high priority to blocks that are expected to cause image degradation. The frequency of the refresh has been determined and adjusted empirically in conventional methods, whereas proper refresh can be realized constantly by the present invention.

Further, in the present invention, the mode selection is carried out by use of the code volume predicted value (LA) of the target block and the estimate of the coding distortion. Therefore, proper mode selection for each block can be carried out concurrently with the encoding in units of blocks, and the amount of necessary operations can be reduced to minimum.

In addition, the present invention employs the encoding mode SKIP in addition to the intra-frame encoding and the inter-frame prediction encoding, as a candidate for the encoding mode selection in consideration of resistance to errors. The code volume occurring when the encoding mode SKIP is selected is as small as 1 bit and the probability of data loss due to errors becomes lower in comparison with other encoding modes, therefore, the resistance to errors can be improved further.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A motion video encoding device which adaptively selects and uses intra-frame encoding or inter-frame prediction encoding for encoding each block as an encoding unit, comprising:

frame memory means for storing an input image and a reference image as the result of decoding of a frame before;

block encoding means for referring to the input image stored in the frame memory means and carrying out a block encoding process for each block of the input image according to a selected encoding mode and a quantization step designating the width of quantization of image data and thereby generating coded data;

code counting means for monitoring the coded data and thereby counting the code volume from the latest synchronization code pattern inserted in the coded data to coded data of a block that has been encoded latest;

code volume control means for referring to the code volume of the coded data outputted by the block encoding means and a pixel value distribution statistic obtained by analyzing the input image and the reference image stored in the frame memory means, thereby calculating the quantization step for each block and for each selectable encoding mode so that image distortion caused by the block encoding process will be minimum, and outputting a code volume predicted value assigned to a target block which will be encoded next, under the condition that the code volume for a frame should be a preset volume or less;

data loss probability estimation means for estimating the probability that data loss will occur to the target block due to transmission error, based on the code volume predicted value assigned to the target block, the code volume counted by the code counting means, and a preset error probability per bit;

frame coding distortion estimation means for estimating frame coding distortion as image distortion caused by the block encoding processes for the frame, by referring to the pixel value distribution statistic of the input image obtained by the code volume control means;

degradation power calculation means for calculating degradation power as error power between the input image and a decoded image assuming that data loss occurred to the target block during data transmission of the coded data, by use of the input image or the reference image stored in the frame memory means;

degradation estimation calculation means for calculating a degradation estimation as an expected value of image degradation occurring to the target block due to data loss caused by transmission error, for each block and for each selectable encoding mode, based on the degradation power calculated by the degradation power calculation means and the data loss probability estimated by the data loss probability estimation means; and mode selection means for selecting an optimum encoding mode for the target block by referring to the degradation estimation calculated by the degradation estimation calculation means and the frame coding distortion estimated by the frame coding distortion estimation means.

2. A motion video encoding device as claimed in claim 1, wherein the degradation power calculation means complements pixel values of the target block with pixel values of surrounding pixels of the input image, and regards error power between the complemented image and the input image as the degradation power.

3. A motion video encoding device as claimed in claim 1, wherein the degradation power calculation means complements pixel values of the target block with pixel values of a block of the reference image at the same position as the target block, and regards error power between the complemented image and the input image as the degradation power.

4. A motion video encoding device as claimed in claim 1, wherein the degradation power calculation means complements pixel values of the target block by copying pixel values from a motion compensation area of the reference image corresponding to the target block, and regards error power between the complemented image and the input image as the degradation power.

5. A motion video encoding device as claimed in claim 1, wherein the data loss probability estimation means estimates the probability that data loss will occur to the target block due to transmission error, by adding the code volume predicted value assigned to the target block by the code volume control means to the code volume counted by the code counting means and multiplying the sum by the preset error probability per bit.

6. A motion video encoding device as claimed in claim 1, wherein the degradation estimation calculation means obtains the degradation estimation in the case of the intra-frame encoding by multiplying the degradation power calculated by the degradation power calculation means by the data loss probability estimated by the data loss probability estimation means, and obtains the degradation estimation in the case of the inter-frame prediction encoding by obtaining the product of the degradation power and the data loss probability, obtaining a degradation propagation term as a degradation estimation of a referred area of the reference image which is referred to for a motion compensation process in the inter-frame prediction encoding, and adding the degradation propagation term to the product.

7. A motion video encoding device as claimed in claim 1, wherein the degradation estimation calculation means obtains the degradation estimation in the case of the intra-frame encoding by multiplying the degradation power calculated by the degradation power calculation means by the data loss probability estimated by the data loss probability estimation means, and obtains the degradation estimation in the case of the inter-frame prediction encoding by obtaining the product of the degradation power and the data loss probability, obtaining a degradation propagation term as a weighted average of degradation estimations of blocks overlapping with a referred area of the reference image which is referred to for a motion compensation process in the inter-frame prediction encoding, and adding the degradation propagation term to the product.

8. A motion video encoding device as claimed in claim 1, wherein the degradation estimation calculation means obtains the degradation estimation in the case of the intra-frame encoding by multiplying the degradation power calculated by the degradation power calculation means by the data loss probability estimated by the data loss probability estimation means, and obtains the degradation estimation in the case of the inter-frame prediction encoding by obtaining the product of the degradation-power and the data loss probability, obtaining a degradation propagation term as a degradation estimation of a referred area of the reference image which is referred to for a motion compensation process in the inter-frame prediction encoding, multiplying the degradation propagation term by a proportionality constant, and adding the multiplied degradation propagation term to the product.

9. A motion video encoding device as claimed in claim 1, wherein the mode selection means obtains the degradation estimation of the target block in each candidate encoding mode from the degradation estimation calculation means, obtains the frame coding distortion in each candidate encoding mode from the frame coding distortion estimation means, and selects a candidate encoding mode that minimizes the sum of the degradation estimation and the frame coding distortion as the optimum encoding mode for the target block.

10. A motion video encoding device as claimed in claim 1, wherein:

the motion video encoding device further comprises block coding distortion estimation means for estimating block coding distortion as image distortion caused by the block encoding process for the target block by referring to the input image and the reference image stored in the frame memory means and the quantization step calculated by the code volume control means, and the mode selection means selects an optimum encoding mode for the target block from the intra-frame encoding, the inter-frame prediction encoding and another encoding mode "skip" in which pixel values are directly copied from a block of the reference image at the same position as the target block, by referring to the degradation estimation calculated by the degradation estimation calculation means, the frame coding distortion estimated by the frame coding distortion estimation means and the block coding distortion estimated by the block coding distortion estimation means, and the degradation estimation calculation means calculates the degradation estimation as an expected value of image degradation occurring to the target block due to data loss caused by transmission error, for each block and for each of the selectable encoding modes: the intra-frame encoding; the inter-frame prediction encoding; and the skip, based on the degradation power calculated by the degradation power calculation means and the data loss probability estimated by the data loss probability estimation means.

11. A motion video encoding device as claimed in claim 10, wherein:

the block coding distortion estimation means estimates the block coding distortion of the target block in the case of the intra-frame encoding or the inter-frame prediction encoding, as quantization distortion by use of the quantization step calculated by the code volume control means, and the block coding distortion estimation means estimates the block coding distortion of the target block in the case of the skip, by obtaining error power between the target block and a block of the reference image at the same position as the target block and regarding the error power as the block coding distortion, and the data loss probability estimation means estimates the data loss probability of the target block in the case of the intra-frame encoding or the inter-frame prediction encoding, based on the code volume predicted value assigned to the target block, the code volume counted by the code counting means, and a preset error probability per bit, and the data loss probability estimation means estimates the data loss probability of the target block in the case of the skip, based on the code volume of a skip code which indicates that the encoding mode is the skip, the code volume counted by the code counting means, and a preset error probability per bit, and the degradation estimation calculation means calculates the degradation estimation of the target block in the case of the skip, in the same way as the case of the inter-frame prediction encoding.

12. A motion video encoding device as claimed in claim 10, wherein the mode selection means obtains the degradation estimation of the target block in each of the intra-frame encoding and the inter-frame prediction encoding from the degradation estimation calculation means, obtains the frame coding distortion in each of the intra-frame encoding and the inter-frame prediction encoding from the frame coding distortion estimation means, selects an encoding mode that minimizes the sum of the degradation estimation and the frame coding distortion from the intra-frame encoding and the inter-frame prediction encoding as a candidate optimum encoding mode for the target block, compares the selected candidate optimum encoding mode with the skip by making a comparison between the two encoding modes with regard to the sum of the degradation estimation calculated by the degradation estimation calculation means and the block coding distortion estimated by the block coding distortion estimation means, and selects one of the two encoding modes that minimizes the sum as the optimum encoding mode for the target block.

13. A motion video encoding method which adaptively selects and uses intra-frame encoding or inter-frame prediction encoding for encoding each block as an encoding unit, comprising the steps of:

an image storage step for storing an input image and a reference image as the result of decoding of a frame before in a frame memory;

a block encoding step for referring to the input image stored in the frame memory and carrying out a block encoding process for each block of the input image according to a selected encoding mode and a quantization step designating the width of quantization of image data and thereby generating coded data;

a code counting step for monitoring the coded data and thereby counting the code volume from the latest synchronization code pattern inserted in the coded data to coded data of a block that has been encoded latest;

a code volume control step for referring to the code volume of the coded data generated in the block encoding step and a pixel value distribution statistic obtained by analyzing the input image and the reference image stored in the frame memory, thereby calculating the quanitization step for each block and for each selectable encoding mode so that image distortion caused by the block encoding process will be minimum, and outputting a code volume predicted value assigned to a target block which will be encoded next, under the condition that the code volume for a frame should be a preset volume or less;

a data loss probability estimation step for estimating the probability that data loss will occur to the target block due to transmission error, based on the code volume predicted value assigned to the target block, the code volume counted in the code counting step, and a preset error probability per bit;

a frame coding distortion estimation step for estimating frame coding distortion as image distortion caused by the block encoding processes for the frame, by referring to the pixel value distribution statistic of the input image obtained in the code volume control step;

a degradation power calculation step for calculating degradation power as error power between the input image and a decoded image assuming that data loss occurred to the target block during data transmission of the coded data, by use of the input image or the reference image stored in the frame memory;

a degradation estimation calculation step for calculating a degradation estimation as an expected value of image degradation occurring to the target block due to data loss caused by transmission error, for each block and for each selectable encoding mode, based on the degradation power calculated in the degradation power calculation step and the data loss probability estimated in the data loss probability estimation step; and a mode selection step for selecting an optimum encoding mode for the target block by referring to the degradation estimation calculated in the degradation estimation calculation step and the frame coding distortion estimated in the frame coding distortion estimation step.

14. A motion video encoding method as claimed in claim 13, wherein in the degradation power calculation step, pixel values of the target block are complemented with pixel values of surrounding pixels of the input image, and error power between the complemented image and the input image is regarded as the degradation power.

15. A motion video encoding method as claimed in claim 13, wherein in the degradation power calculation step, pixel values of the target block are complemented with pixel values of a block of the reference image at the same position as the target block, and error power between the complemented image and the input image is regarded as the degradation power.

16. A motion video encoding method as claimed in claim 13, wherein in the degradation power calculation step, pixel values of the target block are complemented by copying pixel values from a motion compensation area of the reference image corresponding to the target block, and error power between the complemented image and the input image is regarded as the degradation power.

17. A motion video encoding method as claimed in claim 13, wherein in the data loss probability estimation step, the probability that data loss will occur to the target block due to transmission error is estimated by adding the code volume predicted value assigned to the target block in the code volume control step to the code volume counted in the code counting step and multiplying the sum by the preset error probability per bit.

18. A motion video encoding method as claimed in claim 13, wherein in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a degradation estimation of a referred area of the reference image which is referred to for a motion compensation process in the inter-frame prediction encoding, and adding the degradation propagation term to the product.

19. A motion video encoding method as claimed in claim 13, wherein in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a weighted average of degradation estimations of blocks overlapping with a referred area of the reference image which is referred to for a motion compensation process in the inter-frame prediction encoding, and adding the degradation propagation term to the product.

20. A motion video encoding method as claimed in claim 13, wherein in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a degradation estimation of a referred area of the reference image which is referred to for a motion compensation process in the inter-frame prediction encoding, multiplying the degradation propagation term by a proportionality constant, and adding the multiplied degradation propagation term to the product.

21. A motion video encoding method as claimed in claim 13, wherein in the mode selection step, the degradation estimation of the target block in each candidate encoding mode is obtained from the degradation estimation calculation step, the frame coding distortion in each candidate encoding mode is obtained from the frame coding distortion estimation step, and a candidate encoding mode that minimizes the sum of the degradation estimation and the frame coding distortion is selected as the optimum encoding mode for the target block.

22. A motion video encoding method as claimed in claim 13, wherein:

the motion video encoding method further comprises a block coding distortion estimation step for estimating block coding distortion as image distortion caused by the block encoding process for the target block by referring to the input image and the reference image stored in the frame memory and the quantization step calculated in the code volume control step, and in the mode selection step, an optimum encoding mode for the target block is selected from the intra-frame encoding, the inter-frame prediction encoding and another encoding mode "skip" in which pixel values are directly copied from a block of the reference image at the same position as the target block, by referring to the degradation estimation calculated in the degradation estimation calculation step, the frame coding distortion estimated in the frame coding distortion estimation step and the block coding distortion estimated in the block coding distortion estimation step, and in the degradation estimation calculation step, the degradation estimation is calculated as an expected value of image degradation occurring to the target block due to data loss caused by transmission error for each block and for each of the selectable encoding modes: the intra-frame encoding; the inter-frame prediction encoding; and the skip, based on the degradation power calculated in the degradation power calculation step and the data loss probability estimated in the data loss probability estimation step.

23. A motion video encoding method as claimed in claim 22, wherein:

in the block coding distortion estimation step, the block coding distortion of the target block in the case of the intra-frame encoding or the inter-frame prediction encoding is estimated as quantization distortion by use of the quantization step calculated in the code volume control step, and the block coding distortion of the target block in the case of the skip is estimated by obtaining error power between the target block and a block of the reference image at the same position as the target block and regarding the error power as the block coding distortion, and in the data loss probability estimation step, the data loss probability of the target block in the case of the intra-frame encoding or the inter-frame prediction encoding is estimated based on the code volume predicted value assigned to the target block, the code volume counted in the code counting step, and a preset error probability per bit, and the data loss probability of the target block in the case of the skip is estimated based on the code volume of a skip code which indicates that the encoding mode is the skip, the code volume counted in the code counting step, and a preset error probability per bit, and in the degradation estimation calculation step, the degradation estimation of the target block in the case of the skip is calculated in the same way as the case of the inter-frame prediction encoding.

24. A motion video encoding method as claimed in claim 22, wherein in the mode selection step, the degradation estimation of the target block in each of the intra-frame encoding and the inter-frame prediction encoding is obtained from the degradation estimation calculation step, the frame coding distortion in each of the intra-frame encoding and the inter-frame prediction encoding is obtained from the frame coding distortion estimation step, an encoding mode that minimizes the sum of the degradation estimation and the frame coding distortion is selected from the intra-frame encoding and the inter-frame prediction encoding as a candidate optimum encoding mode for the target block, the selected candidate optimum encoding mode is compared with the skip by making a comparison between the two encoding modes with regard to the sum of the degradation estimation calculated in the degradation estimation calculation step and the block coding distortion estimated in the block coding distortion estimation step, and one of the two encoding modes that minimizes the sum is selected as the optimum encoding mode for the target block.

25. A computer-readable record medium storing a computer program for instructing a microprocessor unit to execute a motion video encoding method which adaptively selects and uses intra-frame encoding or inter-frame prediction encoding for encoding each block as an encoding unit, wherein the motion video encoding method comprises the steps of:

an image storage step for storing an input image and a reference image as the result of decoding of a frame before in a frame memory;

a block encoding step for referring to the input image stored in the frame memory and carrying out a block encoding process for each block of the input image according to a selected encoding mode and a quantization step designating the width of quantization of image data and thereby generating coded data;

a code counting step for monitoring the coded data and thereby counting the code volume from the latest synchronization code pattern inserted in the coded data to coded data of a block that has been encoded latest;

a code volume control step for referring to the code volume of the coded data generated in the block encoding step and a pixel value distribution statistic obtained by analyzing the input image and the reference image stored in the frame memory, thereby calculating the quantization step for each block and for each selectable encoding mode so that image distortion caused by the block encoding process will be minimum, and outputting a code volume predicted value assigned to a target block which will be encoded next, under the condition that the code volume for a frame should be a preset volume or less;

a data loss probability estimation step for estimating the probability that data loss will occur to the target block due to transmission error, based on the code volume predicted value assigned to the target block, the code volume counted in the code counting step, and a preset error probability per bit;

a frame coding distortion estimation step for estimating frame coding distortion as image distortion caused by the block encoding processes for the frame, by referring to the pixel value distribution statistic of the input image obtained in the code volume control step;

a degradation power calculation step for calculating degradation power as error power between the input image and a decoded image assuming that data loss occurred to the target block during data transmission of the coded data, by use of the input image or the reference image stored in the frame memory;

a degradation estimation calculation step for calculating a degradation estimation as an expected value of image degradation occurring to the target block due to data loss caused by transmission error, for each block and for each selectable encoding mode, based on the degradation power calculated in the degradation power calculation step and the data loss probability estimated in the data loss probability estimation step; and a mode selection step for selecting an optimum encoding mode for the target block by referring to the degradation estimation calculated in the degradation estimation calculation step and the frame coding distortion estimated in the frame coding distortion estimation step.

26. A computer-readable record medium as claimed in claim 25, wherein in the degradation power calculation step, pixel values of the target block are complemented with pixel values of surrounding pixels of the input image, and error power between the complemented image and the input image is regarded as the degradation power.

27. A computer-readable record medium as claimed in claim 25, wherein in the degradation power calculation step, pixel values of the target block are complemented with pixel values of a block of the reference image at the same position as the target block, and error power between the complemented image and the input image is regarded as the degradation power.

28. A computer-readable record medium as claimed in claim 25, wherein in the degradation power calculation step, pixel values of the target block are complemented by copying pixel values from a motion compensation area of the reference image corresponding to the target block, and error power between the complemented image and the input image is regarded as the degradation power.

29. A computer-readable record medium as claimed in claim 25, wherein in the data loss probability estimation step, the probability that data loss will occur to the target block due to transmission error is estimated by adding the code volume predicted value assigned to the target block in the code volume control step to the code volume counted in the code counting step and multiplying the sum by the preset error probability per bit.

30. A computer-readable record medium as claimed in claim 25, wherein in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a degradation estimation of a referred area of the reference image which is referred to for a motion compensation process in the inter-frame prediction encoding, and adding the degradation propagation term to the product.

31. A computer-readable record medium as claimed in claim 25, wherein in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a weighted average of degradation estimations of blocks overlapping with a referred area of the reference image which is referred to for a motion compensation process in the inter-frame prediction encoding, and adding the degradation propagation term to the product.

32. A computer-readable record medium as claimed in claim 25, wherein in the degradation estimation calculation step, the degradation estimation in the case of the intra-frame encoding is obtained by multiplying the degradation power calculated in the degradation power calculation step by the data loss probability estimated in the data loss probability estimation step, and the degradation estimation in the case of the inter-frame prediction encoding is obtained by obtaining the product of the degradation power and the data loss probability, obtaining a degradation propagation term as a degradation estimation of a referred area of the reference image which is referred to for a motion compensation process in the inter-frame prediction encoding, multiplying the degradation propagation term by a proportionality constant, and adding the multiplied degradation propagation term to the product.

33. A computer-readable record medium as claimed in claim 25, wherein in the mode selection step, the degradation estimation of the target block in each candidate encoding mode is obtained from the degradation estimation calculation step, the frame coding distortion in each candidate encoding mode is obtained from the frame coding distortion estimation step, and a candidate encoding mode that minimizes the sum of the degradation estimation and the frame coding distortion is selected as the optimum encoding mode for the target block.

34. A computer-readable record medium as claimed in claim 25, wherein:

the motion video encoding method further comprises a block coding distortion estimation step for estimating block coding distortion as image distortion caused by the block encoding process for the target block by referring to the input image and the reference image stored in the frame memory and the quantization step calculated in the code volume control step, and in the mode selection step, an optimum encoding mode for the target block is selected from the intra-frame encoding, the inter-frame prediction encoding and another encoding mode "skip" in which pixel values are directly copied from a block of the reference image at the same position as the target block, by referring to the degradation estimation calculated in the degradation estimation calculation step, the frame coding distortion estimated in the frame coding distortion estimation step and the block coding distortion estimated in the block coding distortion estimation step, and in the degradation estimation calculation step, the degradation estimation is calculated as an expected value of image degradation occurring to the target block due to data loss caused by transmission error, for each block and for each of the selectable encoding modes: the intra-frame encoding; the inter-frame prediction encoding; and the skip, based on the degradation power calculated in the degradation power calculation step and the data loss probability estimated in the data loss probability estimation step.

35. A computer-readable record medium as claimed in claim 34, wherein:

in the block coding distortion estimation step, the block coding distortion of the target block in the case of the intra-frame encoding or the inter-frame prediction encoding is estimated as quantization distortion by use of the quantization step calculated in the code volume control step, and the block coding distortion of the target block in the case of the skip is estimated by obtaining error power between the target block and a block of the reference image at the same position as the target block and regarding the error power as the block coding distortion, and in the data loss probability estimation step, the data loss probability of the target block in the case of the intra-frame encoding or the inter-frame prediction encoding is estimated based on the code volume predicted value assigned to the target block, the code volume counted in the code counting step, and a preset error probability per bit, and the data loss probability of the target block in the case of the skip is estimated based on the code volume of a skip code which indicates that the encoding mode is the skip, the code volume counted in the code counting step, and a preset error probability per bit, and in the degradation estimation calculation step, the degradation estimation of the target block in the case of the skip is calculated in the same way as the case of the inter-frame prediction encoding.

36. A computer-readable record medium as claimed in claim 34, wherein in the mode selection step, the degradation estimation of the target block in each of the intra-frame encoding and the inter-frame prediction encoding is obtained from the degradation estimation calculation step, the frame coding distortion in each of the intra-frame encoding and the inter-frame prediction encoding is obtained from the frame coding distortion estimation step, an encoding mode that minimizes the sum of the degradation estimation and the frame coding distortion is selected from the intra-frame encoding and the inter-frame prediction encoding as a candidate optimum encoding mode for the target block, the selected candidate optimum encoding mode is compared with the skip by making a comparison between the two encoding modes with regard to the sum of the degradation estimation calculated in the degradation estimation calculation step and the block coding distortion estimated in the block coding distortion estimation step, and one of the two encoding modes that minimizes the sum is selected as the optimum encoding mode for the target block.

* * * * *